United States Patent [19]

Graham

[11] Patent Number: 4,807,475

[45] Date of Patent: Feb. 28, 1989

[54] ACCELEROMETER

[76] Inventor: Wayne B. Graham, 11630 Jessica La., Los Altos Hills, Calif. 94022

[21] Appl. No.: 92,065

[22] Filed: Sep. 2, 1987

[51] Int. Cl.⁴ ............................................. G01P 15/04
[52] U.S. Cl. ......................................... 73/492; 73/514
[58] Field of Search ............ 73/492, 514, 515, 516 R, 73/517 R; 33/401

[56] References Cited

U.S. PATENT DOCUMENTS

| | | |
|---|---|---|
| 1,523,302 | 1/1925 | Spiro . |
| 1,605,520 | 11/1926 | Dodge . |
| 1,710,594 | 4/1929 | Tapley . |
| 1,842,384 | 1/1932 | Blanchard . |
| 1,975,824 | 10/1934 | Blackwood ............................ 264/1 |
| 2,021,667 | 11/1935 | Miess .................................... 264/1 |
| 2,063,495 | 12/1936 | Elsom .................................... 264/1 |
| 2,108,695 | 2/1938 | Tapley ............................... 73/516 R |
| 2,157,514 | 5/1939 | Whipple ................................ 264/1 |
| 2,190,866 | 2/1940 | Duby ..................................... 264/1 |
| 2,283,180 | 5/1942 | Buchanan ............................ 177/311 |
| 2,302,670 | 11/1942 | Buchanan ............................. 73/514 |
| 2,394,974 | 2/1946 | Bevins ................................... 264/1 |
| 2,888,530 | 5/1959 | Horton .............................. 200/61.52 |
| 2,996,919 | 8/1961 | Rottcher ................................ 73/492 |
| 3,041,882 | 7/1962 | Griffiths ................................ 73/492 |
| 3,073,922 | 1/1963 | Miller ............................... 200/61.48 |
| 3,318,157 | 5/1967 | Browning et al. .................... 73/492 |
| 3,490,292 | 1/1970 | Simmons ............................... 73/492 |
| 3,503,364 | 3/1970 | Dirks .................................... 116/114 |
| 3,513,800 | 5/1970 | Radgens ................................ 116/37 |
| 3,682,001 | 8/1972 | Kitamura et al. ..................... 73/492 |
| 3,727,465 | 4/1973 | Hartley ................................. 73/492 |
| 4,622,548 | 11/1986 | Andres et al. ...................... 340/753 |

FOREIGN PATENT DOCUMENTS

| | | | |
|---|---|---|---|
| 458474 | 12/1936 | United Kingdom ................. 73/514 |
| 878804 | 10/1961 | United Kingdom ................. 73/492 |

Primary Examiner—John Chapman
Attorney, Agent, or Firm—Joseph H. Smith

[57] ABSTRACT

An accelerometer has a single pendulum-type acceleration sensitive element, the movement of the pendulum moving a pointer through a gear arrangement such that scale graduations on a face of the instrument may be linear or of other character. Auxiliary pointers are provided so as to indicate the maximum positive and negative values of acceleration experienced by the instrument, maintaining always the highest magnitude reading attained. The recording auxiliary pointers are manually resettable from outside the instrument.

7 Claims, 4 Drawing Sheets

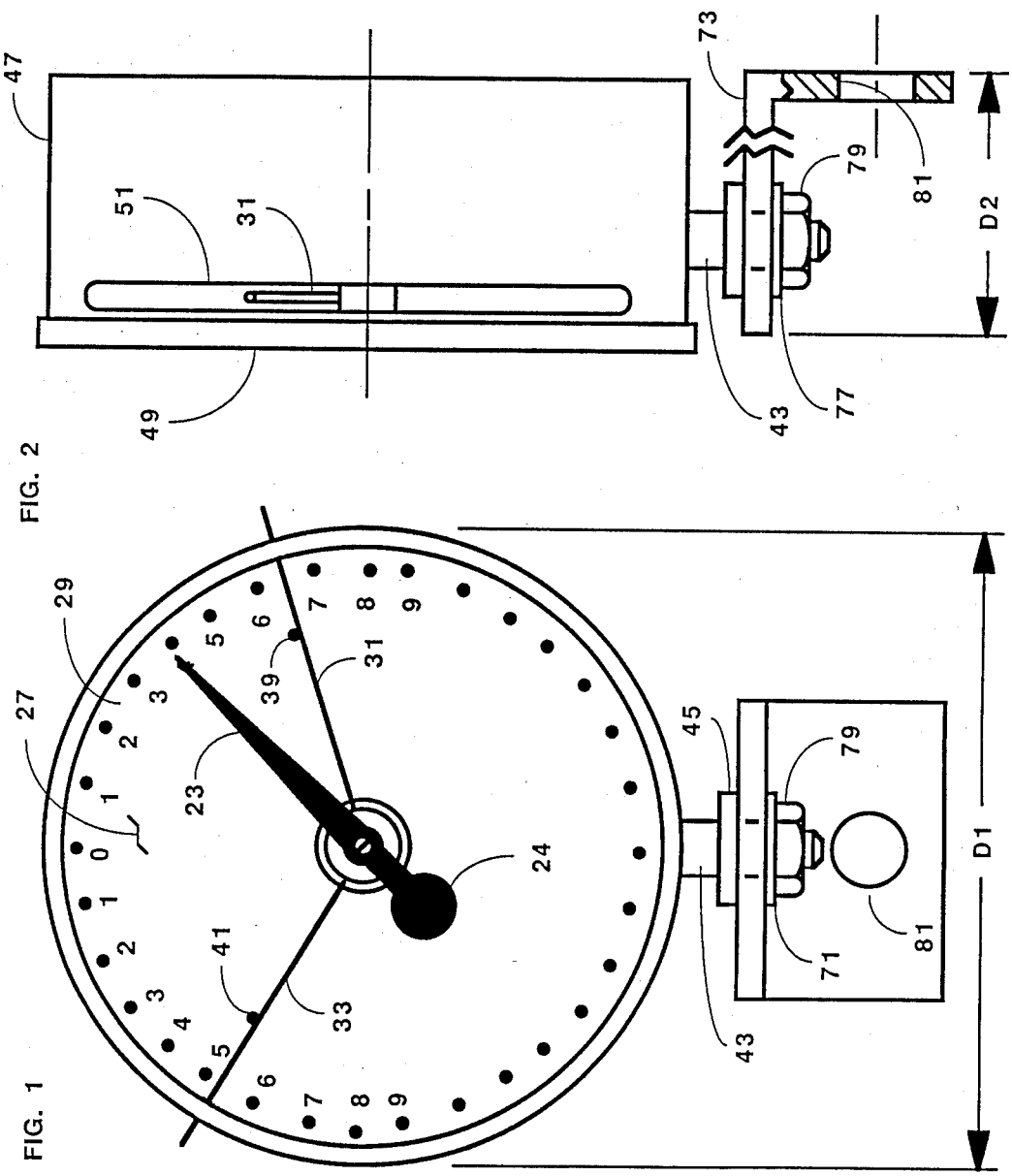

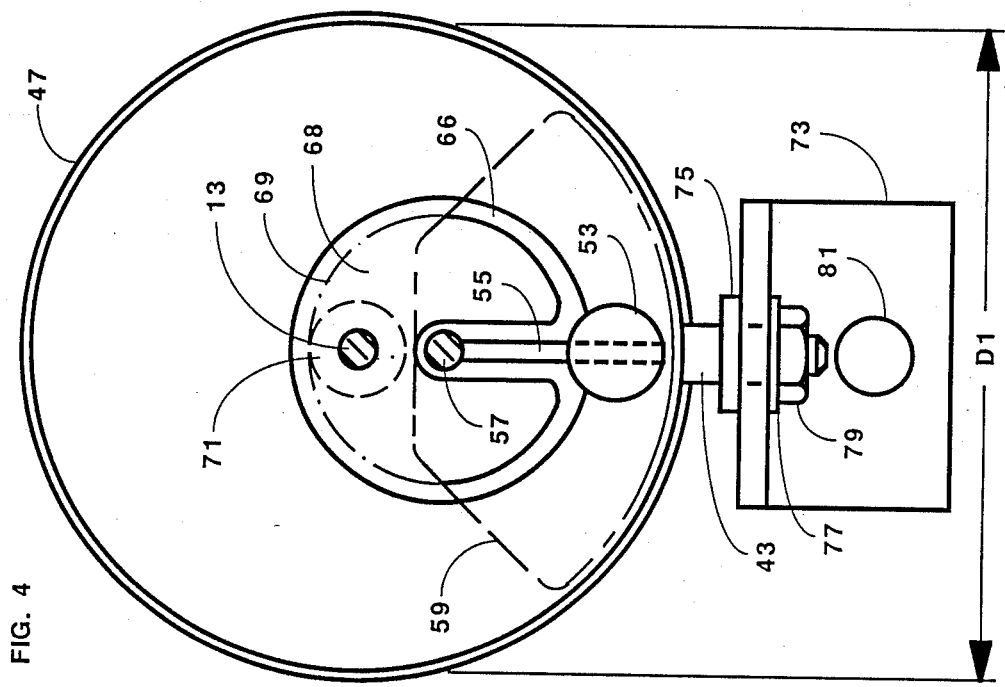
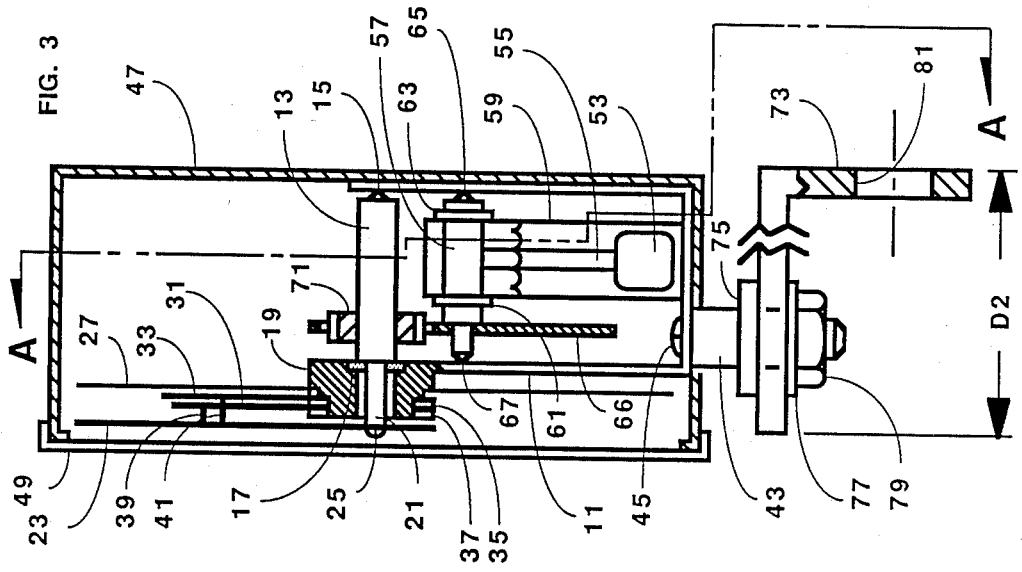

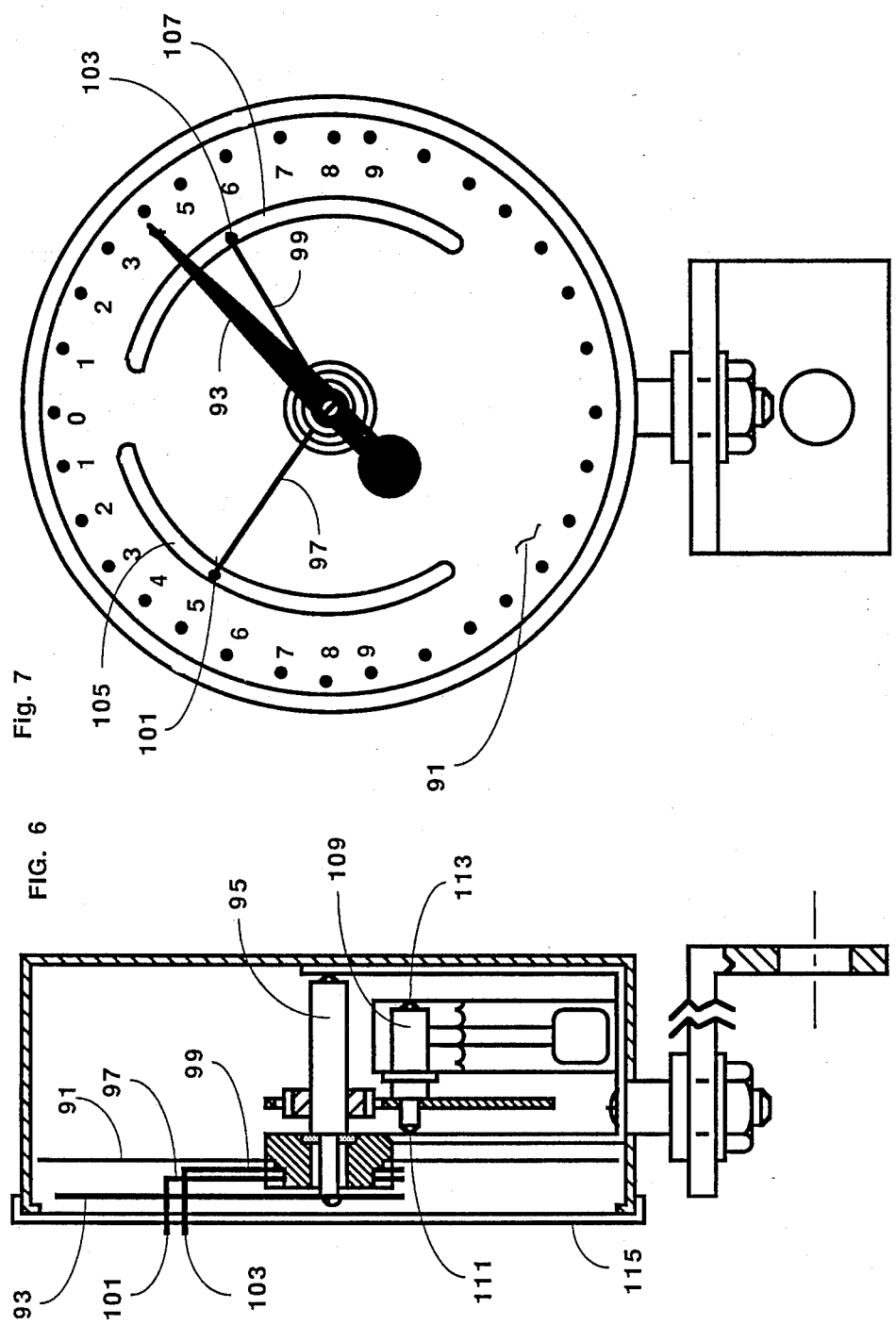

ACCELEROMETER

FIELD OF THE INVENTION

This invention relates to devices for measuring acceleration and displaying the result, and particularly to accelerometers as applied to moving vehicles, such as automobiles.

BACKGROUND OF THE INVENTION

Not long after the advent of engine powered vehicles, it became important to install devices in or on such vehicles for the purpose of measuring and indicating forces due to changes in velocity. It is important today to do so. One good reason for collecting such information is to establish a base of knowledge about stress and strain in structural elements of a vehicle. For example, a history of changes in direction and velocity relative to time for an aircraft during flight can be used in conjunction with a knowledge of the dimensions and materials of construction of the aircraft and the equations of motion in engineering science to calculate stresses and strains in individual framing elements and fasteners. Such knowledge is vital is design.

The rate of change of velocity with respect to time for any object is known as acceleration, and is measured in distance per unit time per unit time, such as meters per second per second. To cause a body to exhibit an increase in velocity in a straight line over a period of time, it is necessary to exert a force on the body in the direction of motion. The relationship between the force exerted and the acceleration of the body is the well known equation:

$$F = m \times a$$

where F is the force, m is the mass of the body, and a is the acceleration. Exerting a force on a moving body in the direction of motion will normally cause a body to accelerate, and likewise, exerting a force on a moving body opposite to the direction of motion will cause the velocity of the body to decrease as a function of time. Forces, velocities and accelerations in engineering calculations are vector quantities, having both magnitude and direction, and a convention is usually established concerning the direction of positive vectors. If, in the example given, the direction of motion is regarded as the positive direction, then a force applied opposite to the direction of motion may be considered a negative force, and a decrease in velocity with respect to time experienced by the object in question as a result of the negative force may be considered a negative acceleration. For purposes of calculation, the concept of negative acceleration is more convenient than deceleration.

Another example of the importance of devices to measure acceleration is the case of the modern automobile. Without, for the moment, considering the forces involved with changes in direction as an automobile rounds curves or corners, considering only an automobile traveling in a straight line, it is clear that the engine and drive train of the automobile must exert a force in the direction of motion to cause the automobile to gain velocity, and that the time rate at which velocity is gained is a function of the ability of the engine and drive train to exert the force. Moreover, if the engine and drive train at one particular time of testing is capable of providing an acceleration of a certain magnitude, the magnitude of acceleration provided at another time of testing may be used in comparison to the former test to gage the relative efficiency of the engine and drive train.

In a like manner, the retarding force (negative force) exerted on the same vehicle by its braking system will cause the velocity to decrease as a function of time, and the measured negative acceleration taken in more than one test (or compared to a standard) may be used to gage the relative efficiency of the braking system.

Only positive and negative acceleration in straight line motion has been thus far discussed in this specification. Forces are involved in changes of direction of velocity as well as changes in magnitude of velocity. An automobile rounding a corner, for example, may maintain the same magnitude of velocity (speed) throughout the maneuver and continue then in a straight line, at the same rate of motion as before. The velocity of the automobile, however, changes in direction, and force is involved as well as acceleration. The driver of the automobile causes force to be applied to the automobile by turning the front wheels, and a friction force between the tires and the road surface is exerted on the automobile. The tighter the turn and the higher the speed at which the turn is executed, the higher the force. At some point, the force required to maintain the turn may exceed the friction between the tires and the road surface, and the automobile, attempting to maintain straight line motion, will skid.

Forces involved in turning are called centrifugal or centripetal forces. The deviating force acting on a body in curvilinear motion around an instantaneous center of rotation is called the centripetal force. In the case of an automobile rounding a corner, the force exerted by the road surface on the tires of the automobile is the centripetal force. The equal and opposite force exerted by the body on the medium of restraint is called the centrifugal force. The force exerted by the tires on the road surface is the centrifugal force. In the system of a ball on a string being whirled in a circle, the force exerted by the string on the ball, acting toward the instantaneous center of rotation, is the centripetal force. The forces involved in turning are necessary to provide acceleration toward the instataneous center of rotation so that turning may be maintained.

There is another acceleration that needs to be discussed to some degree in the proper understanding of accelerometers. This is acceleration due to the universal forces of gravitational attraction. The forces exerted as a result of this natural phenomenon by one body upon another on the Earth's surface are so small as to be negligible for the purposes of understanding accelerometers, but the force exerted on objects by the Earth, known as the gravitational force, is appreciable, and must be taken into account. This force is what we know as the weight of an object, and is an object's mass multiplied by the acceleration of gravity, after the formula $F = m \times a$. In this case $W = m \times g$, where W is weight and g is the "standard" acceleration of gravity on the Earth's surface. Disregarding minor local variations due to altitude and the known flattening of the Earth at the poles, g may be taken with reasonable accuracy as 9.81 meters per second per second; which is equal to 32.174 ft. per second per second.

There have been many devices designed to indicate acceleration for a large number of purposes, and patents have been issued. These devices are generally known as accelerometers. All such devices make use of a mounting by which the device may be fastened to the body for which acceleration information is desired, and at least one acceleration sensitive element that will issue some measurable indication relative to experienced acceleration. Steel balls traveling in grooves on inclined planes have been used, for example, with the length of the grooves oriented in the direction of expected motion of the body, and the inclination of the planes downward in the expected direction of travel. A steel ball will roll up such an inclined groove to a height corresponding to the magnitude of acceleration, and the length along a groove may be marked to indicate the acceleration in some convenient terms, such as meters per second per second, or miles per hour per second. Bubbles in curved glass tubes have been used, and the height to which a column of liquid may rise (or fall) in vertical legs of tubing having a connecting passage is another convenient acceleration sensitive element. The use of a pendulum of one sort or another as the acceleration sensitive element has also been popular.

The particular construction, the choice of sensitive element and the way an accelerometer presents information and, perhaps, records it for later use, is strongly influenced by the general use to which an accelromter might be put. An accelerometer, for example, developed for use in a nuclear submarine, might be a complicated and relatively expensive device; while an instrument to be attached to a shipping crate to record the history of handling of the crate, might be expected to be a more simple and relatively less expensive device, sacrificing, perhaps, some of the more esoteric functions of the instrument meant for the submarine.

One of the uses to which a recording accelerometer might be put, would be to record the acceleration effects over a period of time on a vehicle as a means of monitoring the performance of the operator of the vehicle. One situation in which such an instrument might be desireable would be in cases where one person operates a vehicle owned by another. The granting of the privilege of operating a vehicle is quite often made on the implicit or explicit understanding that the vehicle will be operated in a safe manner. This is the case, for example, in a family situation, where one person may own and be responsible for a vehicle, such as a passenger car, and frequently assign its use to another family member, such as a son or daughter, on the understanding that the vehicle is to be used in a safe manner. This situation also pertains where a company owns a number of cars or trucks, and employees of the company are assigned to drive them.

In these cases of assigned operation with implied or even written agreement as to modes of operation, it would be greatly to the benefit of the responsible owner and/or insurer of such vehicles to have the use of an instrument that could be mounted on the assigned vehicles, with or without the operator's knowledge, and would provide indication of the manner in which the vehicle is operated. Such an instrument need be fairly repeatable and accurate. It should also be small and easily mountable on a vehicle either inside or outside the passenger compartment, or even in the engine compartment. The device would need to record the maximum accelerations experienced in the direction of motion of the vehicle, which would indicate the manner in which an operator increases the vehicle speed and the manner also in which the operator applies the brakes. It should also, either in the same or in a similar instrument, be able to record the maximum accelerations at right angles to the direction of travel of the vehicle, which will tell the manner in which the operator handles the vehicle in cornering. These readings, then, could be accessed by the responsible owner and/or insurer, and compared to standards for performance. The ability to discern irresponsible handling of such a vehicle would enhance public safety and provide a potential savings for the owner and/or insurer, by allowing greater and more accurate discrimination.

The instrument needs also to be rugged and reliable, and should preferably be inexpensive, avoiding the use of electrical and computer systems for operation. Many prior instruments that might be used for such a purpose use multiple elements and many operating parts, and are therefore expensive to fabricate and relatively unreliable in use, Some, such as those incorporating tubing and liquids, may be fragile, and unreliable as a result. Another common fault of accelerometers is the fact that acceleration-sensitive elements are generally not linear in indication. Given the case of a pendulum type instrument, for example, the number of degrees that a pedulum swings through as a result of being acted upon by an acceleration, is a trigonometric function of the magnitude of the acceleration. This fact makes the scale calibrations progressively more difficult to read as higher and higher values of acceleration are measured. What is needed is a rugged, inexpensive instrument that may be conveniently mounted on a vehicle in a variety of ways, and which will provide an easily readable indication of the maximum accelerations experienced over a period of time, but that may also be used to provide a continuous and easily readable indication of acceleration as experienced.

SUMMARY OF THE INVENTION

According to a preferred embodiment of the invention, an acceleromter is provided based on a single pendulum-type acceleration sensitive element, the movement of the pendulum moving a pointer through a simple gear arrangement such that scale graduations on a face of the instrument may be linear or of any other desired character. Auxiliary pointers are provided, co-operating with the pendulum driven pointer, such that the auxiliary pointers indicate the maximum positive and negative values of acceleration experienced by the instrument in the direction of the swing of the sensitive element, maintaining always the highest magnitude reading attained. The recording auxiliary pointers each are manually resettable from outside the instrument of the invention.

BRIEF DESCRIPTION OF THE DRAWINGS

FIG. 1 is a full face view of an accelerometer according to a preferred embodiment of the invention.

FIG. 2 is a side view of the acceleromter of FIG. 1.

FIG. 3 is the same view as FIG. 2, except cut away to show parts internal to the accelerometer.

FIG. 4 is a view of the accelerometer from the side opposite that of FIG. 1, sectioned along line A—A of FIG. 3.

FIG. 6 is a cut away side view showing internal elements of an alternative embodiment of the invention.

FIG. 7 is a face-on view showing the alternative embodiment of FIG. 6.

DETAILED DESCRIPTION OF THE PREFERRED EMBODIMENTS

Figure 5:
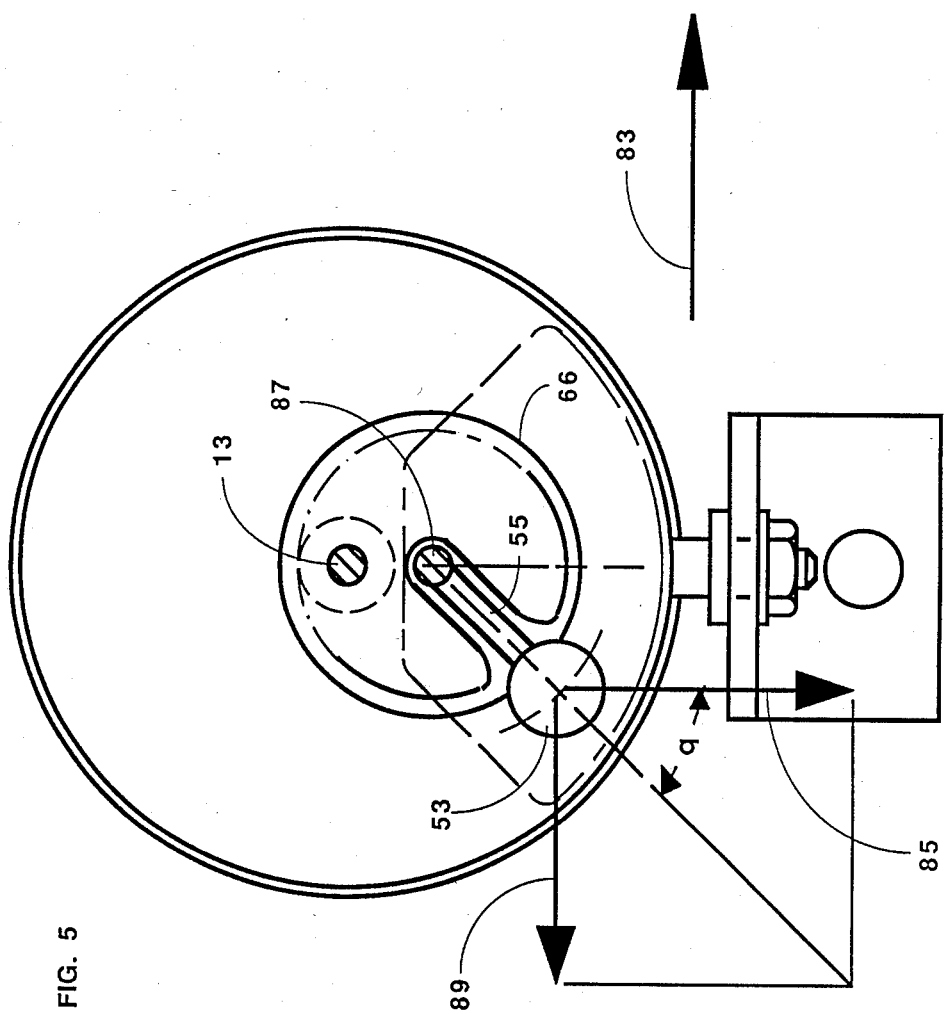
FIG. 5 is view similar to FIG. 4, but with the accelerometer in use, showing the function of the various parts.

FIGS. 1, 2, 3 and 4 show an accelerometer according to the invention, mountable to a vehicle or other body for which information about acceleration is desired. A U-shaped framing element 11, shown in FIG. 3, is a main structural member of the accelerometer, and provides pivot points for two short shaft members. Indicator shaft 13 is the upper of the two shafts, and mounts in framing element 11 at povit point 15 on one side of the frame, and through a bearing 17 on the other side of the frame. Framing element 11 has an extended boss portion 19 into which bearing 17 is mounted, and shaft 13 has an extension 21 through bearing 17 and boss 19.

Boss 19 of the framing element has a shoulder upon which a dial plate 27 is fixedly mounted, and the extension of shaft 13 is through the plane of the dial plate. The dial plate is seen in face-on view of FIG. 1, and has numbered divisions 29 beginning at the top center with zero and increasing in both directions around the dial plate. The numbers and divisions shown in FIG. 1 are arbitrary, and not intended to show actual scale divisions that would be used with an accelerometer. In the preferred embodiment the dial plate and the body of the accelerometer are about 10 cm. in diameter. There is a pointer 23 fixedly attached by screw fastener 25 to the end of shaft 13 and the axis of the shaft is at the center of the circular dial plate. As shaft 13 rotates, pointer 23 rotates and indicates according to the numbered divisions on the dial plate. Pointer 23 has a counterbalancing portion 24 in order that gravity will have no effect on the position of the pointer.

There are two other pointers that indicate on the dial plate, but that are not attached to indicator shaft 13. Pointers 31 and 33 are both mounted to a shoulder of framing element boss 19, separated by washers 35 and 37, such that each may be rotated relative to the other and relative to boss 19. Washers 35 and 37 are of a bearing material, such as teflon, and these washers and the two pointers are held in place on boss 19 by a snap ring (not shown) at the open end of boss 19. The compression of the stack of the bearing washers and the two pointers on boss 19 is such that either of the pointers may be rotated with a small force, but there is enough friction that either pointer will remain in place in the absence of a force to rotate it.

Pointer 23 rotates in a plane perpendicular to the axis of shaft 13 as the shaft rotates. Pointer 31 rotates in a plane between pointer 23 and the dial plate, and pointer 33 rotates in a plane between pointer 31 and the dial plate. Pointer 31 has a cog 39 that extends at a right angle to the planes of the pointers and through the plane of rotation of pointer 23. Pointer 33 has a similar cog 41 that also extends through the plane of pointer 23. As pointer 23 rotates in either direction from vertical (zero), if it encounters either cog 39 in one direction or cog 41 in the other, it will move the pointer associated with the cog along with its own rotary motion. As pointer 23 recedes from a maximum indication back toward zero, the pointer moved, 31 or 33, will remain at the maximum indication, Assuming that movement of pointer 23 clockwise and counterclockwise from zero do not overlap, the position of pointers 31 and 33 will record the maximum swing in each direction of pointer 23.

Framing element 11 is attached to a pedestal shaft 43 by a screw fastener 45. A cylindrical enclosing bezel 47 with a slot to clear the pedestal shaft attaches to the framing element by screw fasteners (not shown) on the side opposite the dial face, and forms a main enclosure for the accelerometer. Bezel 47 may be plastic, sheet metal or other convenient material, and is open on the dial face side. The rim of the bezel on the dial face side is configured to accept a transparent plastic window cover 49, which in the preferred embodiment snaps over the diameter of the bezel. This window cover may be configured to thread onto the bezel, or may attached by a separate mounting ring.

Pointer 31 with cog 39 is longer than the radius of bezel 47 and extends through a slot 51 in bezel 47, which can be seen best in FIGS. 1 and 2. Pointer 33 with cog 41 is of a similar length and extends through a similar slot (not shown) on the opposite side of the bezel from slot 51. The extension of each pointer beyond the bezel is about 1 cm. With the accelerometer not in use and pointer 23 not indicating, the extension of pointers 31 and 33 beyond the bezel provide for manually resetting the pointers between uses of the accelerometer.

The acceleration sensitive element of the accelerometer is a weight 53 on a pendulum arm 55 which is fixedly attached to a pendulum shaft 57. Shaft 57 passes through a closed chamber 59 which is fabricated of either plastic or sheet metal, and has openings for the shaft. The chamber is shown sectioned in FIG. 3 and the outer shape of the chamber is shown in phantom view of FIG. 4. The chamber is adjustably mounted to framing element 11 by fasteners (not shown), and has polymer lip seals 61 and 63 at the openings for shaft 57. Chamber 59 is filled at assembly of the accelerometer with a suitable viscous liquid, and the fill opening then sealed, so that the pendulum of weight 53 and arm 55 is suspended in the fluid. Polymer seals 61 and 63 prevent the liquid from escaping the chamber during operation. The sides of the chamber have been fabricated at an angle relative to the vertical in order to provide a baffle to inhibit any sloshing of the damping fluid.

Pendulum shaft 57 is pivoted between the sides of framing element 11 at pivot points 65 and 67, and the lip seals and the liquid chamber position may be adjusted so the pendulum is free to swing between the pivot points. A gear disk 66 is fixedly attached to shaft 57 against a shoulder on the shaft, and will rotate along with the shaft under the influence of the pendulum. The gear disk in the preferred embodiment has an opening 68 (FIG. 4), which has gear teeth facing inward (toward center) along approximately 180 degrees of circular arc 69. The position of shaft 57 relative to shaft 13 is such that a pinion 71 mounted on shaft 13 meshes with the gear teeth of gear disk 66. Movement of the pendulum rotates shaft 57 and disk 66, which, through the gear teeth, rotates shaft 13 in the same direction as shaft 57, but to a degree dependent on the gear ratio between disk 66 and pinion 71. Rotation of shaft 13 moves indicator pointer 23. Opening 68 encompasses more than 180 degrees of arc so that there will never be interference in operation between gear disk 66 and pinion 71. The purpose of the inward facing teeth 69 on gear disk 66 is to cause the pointer to move in the direction of the measured acceleration, ie. if the acceleration is to the right the pointer moves to the right, and if the acceleration is to the left the pointer moves to the left.

Pedestal shaft 43 bolts through a mounting bracket 73 against a shoulder 75 and is secured by a washer 77 and a nut 79 in the preferred embodiment. The mounting bracket 73 is shown in FIG. 3 by a broken section, and, in the preferred embodiment, dimension D2 is about 5 cm. Dimension D1 is about 13 cm., so the body of the accelerometer may be rotated about pedestal shaft 43 to any desired position and re-secured by nut 79 without interference with whatever surface might be used in conjunction with bracket 73 to mount the accelerometer on a body for measurement. A single mounting hole 81 in the bracket is convenient so that the vertical position of the accelerometer may be set with the pointer 23 indicating zero.

FIG. 6 is a cutaway side view, similar to FIG. 3, and FIG. 7 is a face-on view, similar to FIG. 1, of an alternative embodiment. In the alternative embodiment a dial plate 91 is positioned behind an indicating pointer 93, which is fastened to shaft 95. There are two auxiliary pointers 97 and 99 in front of dial plate 91, similar to pointers 33 and 31, except they are each of lesser length than pointers 33 and 31. Auxiliary pointer 97 ends in a nib portion 101 which extends through an arcuate opening 105 in face plate 115, such that pointer 23 may contact nib portion 101 of pointer 97 when pointer 23 rotates in a counterclockwise direction. The mounting of auxiliary pointer 97 is similar to the mounting of auxiliary pointer 33, so the maximum movement of pointer 23 over a period of time will be indicated by the position of nib 101. Second pointer 99 has a nib portion 103 that extends through an arcuate opening 107 in the face plate such that the maximum movement of pointer 23 over a period of time will be indicated by the position of nib 103.

Another difference between the alternative embodiment of FIG. 6 and 7 and the embodiment of FIGS. 1, 2, 3 and 4 is in the mounting of the pendulum shaft. In FIG. 6 shaft 109 has a pivot point 113 which is inside the fluid chamber and a second pivot point 111 outside the chamber, so only one lip seal is required for the fluid chamber. The use of a single lip seal is an advantage, and the auxiliary pointers protruding through the baseplate allows the assembly to be enclosed with all the pointer positions visible through a transparent face. In operation, the accelerometer is positioned so that the pendulum may swing in a plane parallel to the direction in which acceleration is to be measured. If for example, the accelerometer is mounted on a passenger car, and it is desired to measure and record the maximum values of either the starting acceleration or the braking (negative) acceleration, or both, the accelerometer would be placed so that the plane of movement of the pendulum would be parallel to the forward line of motion of the car. If, on a passenger car (or similar vehicle) it is desired to measure the accelerations due to cornering, the accelerometer would be mounted so that the plane of motion of the pendulum would be orthogonal to the forward line of motion of the car. In either case the accelerometer would be mounted "upright" so the indicating pointer would read zero with the vehicle at rest. If some information is available concerning expected "body lean" or other inclination that will occur during a test, that lean can be compensated for in the dial scale.

FIG. 5 is a view of the accelerometer similar to FIG. 4, except the accelerometer is being accelerated in the direction of arrow 83. In the case where the acceleration is constant, the pendulum will assume a rotated position at an angle theta relative to vertical. A static force analysis of the pendulum requires that the sum of the forces in the horizontal direction is zero, that the sum of the forces vertically is also zero, and that the sum of the moments about any point is zero. For purposes of analysis it may be assumed, since weight 53 is large, and arm 55 is small, that the center of gravity of the pendulum is at the center of the weight. Arrow 85 represents the force of gravity acting on the pendulum, and is equal to m×g, where m is the mass and g is the standard acceleration of gravity. An equal and opposite force (not shown) is acting at pivot 87, so the sum of forces vertically is zero. For the pendulum to be accelerated with the rest of the accelerometer, there must be a force acting at the pivot in the direction of motion and acceleration, that is, arrow 83. Arrow 89 represents the equal and opposite force on the pendulum required by equilibrium. Also from the basic equation $F = m \times a$, Force 89 is m×a, where a is the acceleration experienced by the vehicle to which the accelerometer is attached, and therefore by the accelerometer and the pendulum. The mathamatics of trigonometry along with the principles of vector summation shows that the tangent of the angle theta is equal to a/g. If a=g then, theta =45 degrees. So rotation of the pendulum by 45 degrees indicates a measured acceleration of 1 standard "g".

The pendulum operates in chamber 59 in the preferred embodiment immmersed in a viscous liquid, and the purpose of the liquid bath is to damp the action of the pendulum, so it will show a steady response to the experienced acceleration without "overswinging" and undue vibration. FIG. 5 shows that gear disk 66 has rotated by angle theta, and shaft 13 (and pointer 23) will rotate by angle theta times the ratio of pitch diameters between the gear disk and pinion 71. These relationships make it a relatively simple matter to design and mark dial faces as desired for different applications. The instrument of the invention is particularly applicable for measuring relatively small accelerations, because the scale factor by the gearing allows small movements of the pendulum to be magnified.

In use, one fixes the accelerometer to the body of whatever vehicle or other object for which acceleration information is desired, establishing the plane of the pendulum parallel to the direction in which acceleration is to be measured. Pointers 31 and 33 are manually set to near zero, and the accelerometer position is set for pointer 23 to be at zero. After some period of movement of the object (operation of the vehicle) the positions of pointers 31 and 33 will indicate the maximum acceleration experienced during the test. For use on a vehicle, two such accelerometers might be mounted, one to indicate starting and stopping acceleration, and one to indicate cornering acceleration. Accelerometers according to the invention can be mounted anywhere on a vehicle, with or without the knowledge of the vehicle operator, and will provide a reliable indication of the driving habits, over a period of time, of the vehicle operator.

It will be evident to a worker skilled in the art of measuring and recording force and acceleration and the like, that many deviations may be made in the preferred embodiment without substantially departing from the spirit and scope of the invention. For example, other embodiments of the invention may use a different damping arrangement. Magnetic plates attached to either shaft could be used to damp the motion by eddy current effects. The gear ratio between the gear members may be changed in a variety of ways for a variety of purposes. Also, the particular form of the bracket mounting of the preferred embodiment is a matter of design for convenience. The mounting of the accelerometer to another body may be accomplished by a large number of alternative designs to accomplish the purpose of holding the accelerometer vertically and orienting the pendulum in a preferred direction for measurement. The manner in which pointers 31 and 35 are brought out through bezel 47 is another feature to which changes can be made resulting in other embodiments without departing substantially from the spirit and scope of the invention. The cogs, for example, could be brought out through faceplate 49 rather than through bezel 47, or, the pointers might protrude through the opposite side of bezel 47 from where they are shown in the preferred embodiment. There are many such changes that would result in alternative embodiments, without departing from the spirit and scope of the invention.

What is claimed is:

1. An apparatus for measuring acceleration comprising:
   a first shaft;
   a pendulum fixed to said first shaft such that movement of said pendulum causes rotation of said first shaft;
   a first gear member attached to said first shaft, said first gear member having a portion with gear teeth on an internal arc;
   a second shaft parallel to and spaced apart from said first shaft;
   a second gear member attached to said second shaft, said second gear member being an external gear and engaging said first gear member such that said second shaft rotates in the same rotary direction as said first shaft;
   a first pointer attached to said second shaft for indicating the rotation of said second shaft;
   a dial face adjacent to said first pointer, said dial face having a scale to indicate the amplitude of movement of said first pointer;
   a second pointer rotating about the same center as said first pointer, said second pointer operable by said first pointer in one rotary direction, said second pointer for indicating the maximum movement of said first pointer in said one rotary direction;
   a frame for supporting said first and second shafts, said pointers and said dial face; and,
   mounting means connected to said frame for mounting said apparatus to another body.

2. An apparatus as in claim 1 further comprising a third pointer rotating about the same center as said first and second pointers, said third pointer operable by said first pointer in an other rotary direction from said second pointer, said third pointer for indicating the maximum movement of said first pointer in said other rotary direction.

3. An apparatus as in claim 1 further comprising a damping means for preventing undesired movement of said pendulum of said apparatus.

4. An apparatus as in claim 3 wherein said damping means comprises a chamber enclosing said pendulum, with a portion of said pendulum being immersed in a viscous fluid contained in said chamber.

5. An apparatus as in claim 1 wherein said second pointer has a portion accesible with said apparatus mounted in a test position, such that said second pointer may be independently moved relative to said dial face.

6. An apparatus as in claim 2 wherein said third pointer has a portion accessible with said apparatus mounted in a test position, such that said third pointer may be independently moved relative to said dial face.

7. An apparatus for measuring acceleration comprising:
   pendulum means for sensing said acceleration, said pendulum means constrained to swing in a vertical plane, vertical being defined by the local direction of gravity;
   first gear means moving with said pendulum means such that said first gear means rotates about its center of rotation in the same direction as said pendulum means as said pendulum means swings;
   second gear means pivoted separately from, and coupled to, said first gear means such that said second gear means rotates in the same angular direction as said first gear means; and
   pointer means attached to and pivoted together with said second gear means for indicating the angular displacement of said second gear means;
   said pointer means extending in the opposite direction from said pendulum means, such that an acceleration of the apparatus perpendicular to the vertical in a first direction that is parallel to the vertical plane of the pendulum causes said pointer to pivot toward the first direction, and an acceleration of the apparatus in a second direction that is opposite the first direction causes said said pointer to pivot toward said second direction.

* * * * *